US008602165B2

(12) United States Patent  
Szolomayer et al.

(10) Patent No.: US 8,602,165 B2
(45) Date of Patent: *Dec. 10, 2013

(54) CONTINUOUS SUPPLY FLUID RESERVOIR

(75) Inventors: Robert D. Szolomayer, Marlborough, CT (US); David L. Motto, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,825

(22) Filed: Mar. 28, 2012

(65) Prior Publication Data

US 2012/0192974 A1 Aug. 2, 2012

Related U.S. Application Data

(63) Continuation of application No. 12/233,332, filed on Sep. 18, 2008, now Pat. No. 8,181,746.

(51) Int. Cl.
*F01D 25/18* (2006.01)
*F16K 17/36* (2006.01)

(52) U.S. Cl.
USPC ....... 184/6.11; 137/38; 137/565.33; 137/574; 137/576

(58) Field of Classification Search
USPC ........... 137/38, 43, 565.29, 565.33, 574, 576; 184/6.11, 6.23; 60/39.08
See application file for complete search history.

(56) References Cited

U.S. PATENT DOCUMENTS

| 1,364,770 | A | | 1/1921 | Lindberg | |
|---|---|---|---|---|---|
| 1,743,966 | A | * | 1/1930 | Goudard | 137/590 |
| 2,006,865 | A | * | 7/1935 | Lake | 137/590 |
| 2,022,443 | A | * | 11/1935 | Stollberg | 137/590 |
| 2,024,336 | A | * | 12/1935 | Cavanaugh | 184/6.23 |
| 2,161,060 | A | | 6/1939 | Kelsey | |
| 2,316,729 | A | | 4/1943 | Tryon | |
| 2,453,217 | A | * | 11/1948 | Gregg et al. | 184/6.13 |
| 2,719,583 | A | | 10/1955 | Malick | |
| 2,830,668 | A | | 4/1958 | Gaubis et al. | |
| 2,860,648 | A | | 11/1958 | Harrison | |

(Continued)

FOREIGN PATENT DOCUMENTS

| EP | 1104742 A1 | 6/2001 |
|---|---|---|
| EP | 1510658 A2 | 3/2005 |

(Continued)

OTHER PUBLICATIONS

The Official Partial European Search Report of the European Patent Office in counterpart foreign Application No. 90252230, filed Sep. 18, 2008, dated Nov. 9, 2010.

(Continued)

*Primary Examiner* — John Rivell
(74) *Attorney, Agent, or Firm* — Kinney & Lange, P.A.

(57) ABSTRACT

An assembly for holding a fluid includes an auxiliary reservoir inside a main reservoir. The auxiliary reservoir includes an auxiliary reservoir shell with a fill passage at or near its bottom. The auxiliary reservoir shell also has a vent passage at or near its top. The fill passage and the vent passage fluidically connect the auxiliary reservoir to the main reservoir. A fluid inlet is located inside the main reservoir and outside of the auxiliary reservoir. A fluid outlet located inside the auxiliary reservoir between the fill passage and the vent passage.

12 Claims, 6 Drawing Sheets

(56) References Cited

U.S. PATENT DOCUMENTS

| | | | |
|---|---|---|---|
| 2,942,612 A | 6/1960 | Klank, Jr. | |
| 2,975,793 A | 3/1961 | Klank, Jr. | |
| 2,984,975 A | 5/1961 | Rodgers et al. | |
| 2,992,656 A | 7/1961 | Elliott et al. | |
| 3,130,022 A * | 4/1964 | Clark | 96/187 |
| 4,049,401 A | 9/1977 | Smith | |
| 4,153,141 A | 5/1979 | Methlie | |
| 4,170,873 A | 10/1979 | Milo | |
| 4,210,176 A | 7/1980 | Emming | |
| 4,287,913 A | 9/1981 | Bennett et al. | |
| 4,309,870 A | 1/1982 | Guest et al. | |
| 4,531,358 A | 7/1985 | Smith | |
| 4,545,791 A | 10/1985 | Schweikl et al. | |
| 4,580,591 A | 4/1986 | Lebourg | |
| 4,664,134 A | 5/1987 | Pera | |
| 4,809,745 A | 3/1989 | Hormann | |
| 4,813,445 A | 3/1989 | Lu | |
| 4,815,436 A | 3/1989 | Sasaki et al. | |
| 5,141,179 A | 8/1992 | Gautier | |
| 5,237,977 A | 8/1993 | Tuckey | |
| 5,551,405 A | 9/1996 | Thompson | |
| 6,142,167 A | 11/2000 | Pettesch | |
| 6,267,147 B1 | 7/2001 | Rago | |
| 6,394,123 B2 | 5/2002 | Menu et al. | |
| 6,463,819 B1 | 10/2002 | Rago | |
| 6,698,692 B1 | 3/2004 | Tichenor et al. | |
| 6,793,042 B2 | 9/2004 | Brouillet | |
| 7,118,336 B2 | 10/2006 | Waddleton | |
| 8,181,746 B2 * | 5/2012 | Szolomayer et al. | 137/574 |
| 2001/0002596 A1 | 6/2001 | Menu et al. | |
| 2006/0032663 A1 | 2/2006 | Hosoya | |
| 2006/0249332 A1 | 11/2006 | Bruce | |
| 2008/0264726 A1 | 10/2008 | Cornet et al. | |

FOREIGN PATENT DOCUMENTS

| | | |
|---|---|---|
| EP | 1936122 A1 | 6/2008 |
| EP | 1936122 B1 | 3/2010 |
| FR | 2621562 A1 | 4/1989 |
| GB | 0580006 | 8/1946 |
| WO | 2006013168 A1 | 2/2006 |

OTHER PUBLICATIONS

European Patent Office International Search Report and Written Opinion in international Application No. EP09252230, dated Mar. 21, 2011.

* cited by examiner

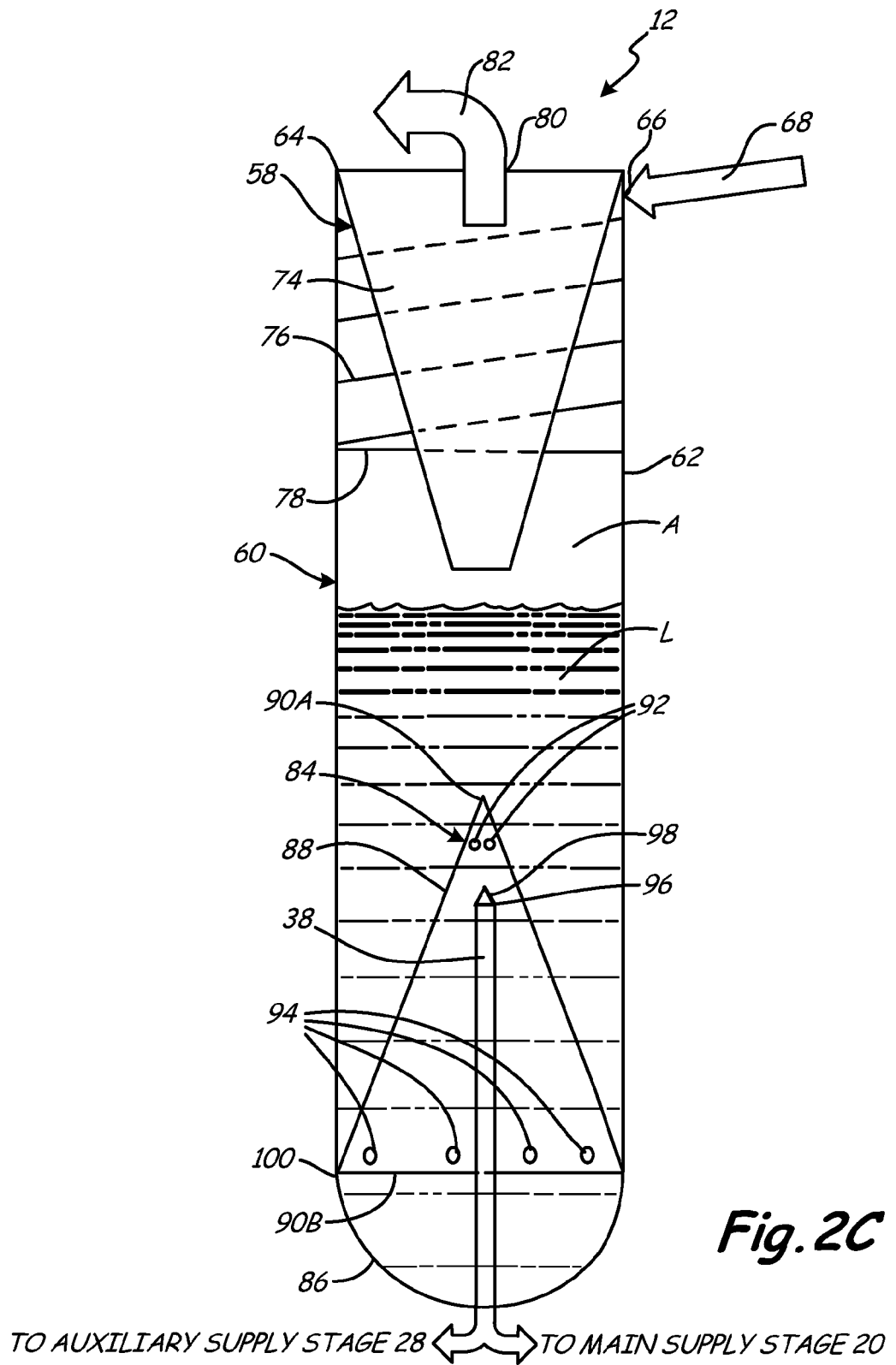

CONTINUOUS SUPPLY FLUID RESERVOIR

CROSS-REFERENCE TO RELATED APPLICATION

This application is a continuation of U.S. patent application Ser. No. 12/233,332, now U.S. Pat. No. 8,181,746, entitled "Continuous Supply Fluid Reservoir," filed on Sep. 18, 2008 by Szolomayer, et al.

BACKGROUND

The present invention relates to reservoirs, and more particularly, to fluid reservoirs for use in gas turbine engines.

In many gas turbine engines, a fluid reservoir is used to store liquid lubricating oil for engine components. A supply pump attached to a supply passage takes liquid from the fluid reservoir to the engine components, and a scavenge pump attached to a scavenge passage returns the liquid from the engine components to the fluid reservoir. When a scavenge pump returns liquid to the fluid reservoir, it typically returns air along with the liquid. Consequentially, the fluid reservoir holds air and liquid. During normal operating conditions, the liquid settles at the bottom of the fluid reservoir and displaces air to the top. However, a fluid reservoir for a gas turbine engine mounted on an aircraft may experience "negative gravity" conditions such as the aircraft turning upside down, the aircraft accelerating toward the Earth at a rate equal to or greater than the rate of gravity, or the aircraft decelerating at the end of a vertical ascent. Under negative gravity conditions, the liquid in the fluid reservoir can rise to the top, which can expose the opening of the supply passage to air and interrupt the supply of liquid to the engine components. Certain engine components, such as gears and bearings, can be damaged in a relatively short period of time without lubrication.

Typically, a lubrication system includes a single fluid reservoir and a single supply pump driven by a high pressure spool. When the high pressure spool stops rotating or rotates at a reduced rpm (revolutions per minute), the single supply pump will ordinarily provide little or no liquid to engine components. Certain engine components can continue rotating when the high pressure spool stops rotating or rotates at a reduced rpm (revolutions per minute). For example, while the aircraft is parked on the ground or during an in-flight engine shutdown, wind may rotate a fan, a low pressure compressor, and, consequentially, the low pressure spool and the corresponding gears and bearings. Certain gears and bearings could be damaged by non-lubricated operation.

SUMMARY

According to the present invention, an assembly for holding a fluid includes an auxiliary reservoir inside a main reservoir. The auxiliary reservoir includes an auxiliary reservoir shell with a fill passage at or near its bottom. The auxiliary reservoir shell also has a vent passage at or near its top. The fill passage and the vent passage fluidically connect the auxiliary reservoir to the main reservoir. A fluid inlet is located inside the main reservoir and outside of the auxiliary reservoir. A fluid outlet is located inside the auxiliary reservoir between the fill passage and the vent passage.

BRIEF DESCRIPTION OF THE DRAWINGS

FIG. 2C is a schematic sectional view of another alternative embodiment of the fluid storage assembly of FIG. 2A.

DETAILED DESCRIPTION

In general, the present invention provides a lubricating system having a main reservoir and an auxiliary reservoir inside and at a bottom of the main reservoir. Liquid in the main reservoir flows into the auxiliary reservoir so that the auxiliary reservoir is substantially full of liquid during normal operating conditions. The size and location of passages between the auxiliary reservoir and the main reservoir are configured so that the auxiliary reservoir remains substantially full of liquid, as opposed to allowing the liquid to quickly flow back into the main reservoir, during brief periods of negative gravity conditions. A roll-over valve can further reduce liquid flow through one or more passages during negative gravity conditions. This allows a supply passage connected to the auxiliary reservoir to have a relatively continuous supply of liquid for lubricating components on a gas turbine engine.

Figure 1:
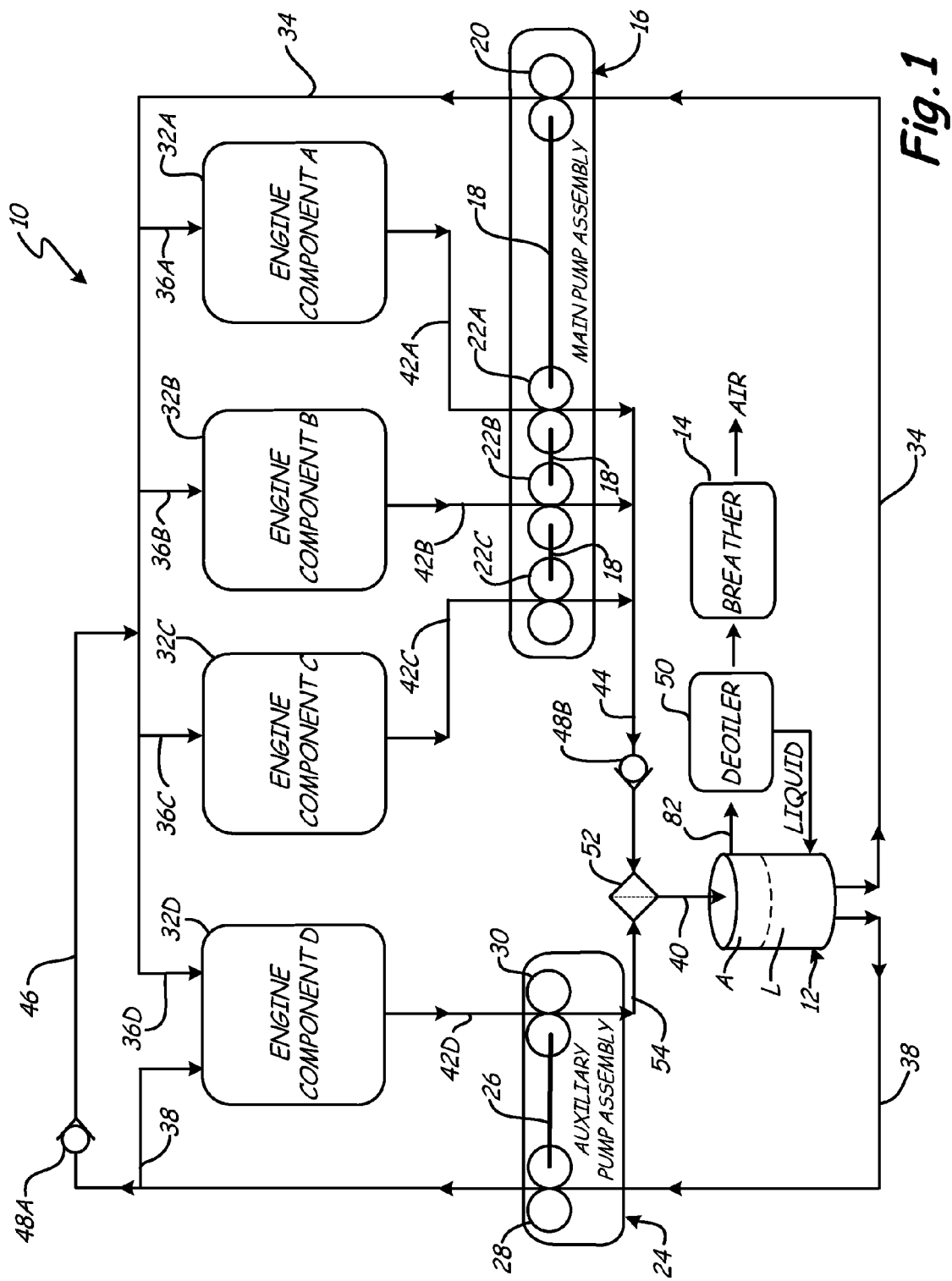
FIG. 1 is a schematic view of a lubrication apparatus of the present invention.

FIG. 1 is a schematic view of lubrication apparatus 10, which is configured for storing lubricating oil for use in a gas turbine engine (not shown), for supplying lubricant to various engine components, and for scavenging lubricant from the same. In the illustrated embodiment, the system generally acts on two fluids: air and liquid lubricating oil. Lubrication apparatus 10 includes fluid storage assembly 12, breather 14, main pump assembly 16, main pump shaft 18, main supply stage 20, main scavenge stages 22A, 22B, and 22C, auxiliary pump assembly 24, auxiliary pump shaft 26, auxiliary supply stage 28, auxiliary scavenge stage 30, engine components 32A, 32B, 32C, and 32D, main supply passage 34, supply sub-passages 36A, 36B, 36C, and 36D, auxiliary supply passage 38, scavenge passage 40, scavenge sub-passages 42A, 42B, 42C, and 42D, combined main scavenge passage 44, backup connection passage 46, check valves 48A and 48B, deoiler 50, filter 52, and auxiliary scavenge passage 54.

Fluid storage assembly 12 stores two fluids, liquid L and air A, in a manner described further below. Main pump assembly 16 includes main supply stage 20 and main scavenge stages 22A, 22B, and 22C. Main supply stage 20 and main scavenge stages 22A, 22B, and 22C are all driven by main pump shaft 18, which can be connected through gearing to a high pressure spool (not shown) of a gas turbine engine. Main supply stage 20 pumps liquid L from fluid storage assembly 12 through main supply passage 34. Main supply passage 34 splits downstream of main supply stage 20 into supply sub-passages 36A, 36B, 36C, and 36D. Supply sub-passages 36A, 36B, 36C, and 36D deliver liquid L to engine components 32A, 32B, 32C, and 32D, respectively. Main scavenge stages 22A, 22B, and 22C pump liquid L and air A from engine components 32A, 32B, and 32C through scavenge sub-passages 42A, 42B, and 42C, respectively. Scavenge sub-passages 42A, 42B, and 42C combine into combined main scavenge passage 44 downstream of main scavenge stages 22A, 22B and 22C. Liquid L is pumped through combined main scavenge passage 44, through check valve 48B, through filter 52, through scavenge passage 40, and into fluid storage assembly 12. Filter 52 reduces debris flow into fluid storage assembly 12. Check valve 48B allows fluid flow from main scavenge stages 22A, 22B and 22C to filter 52 but impedes fluid flow in an opposite direction.

Auxiliary pump assembly 24 includes auxiliary supply stage 28 and auxiliary scavenge stage 30. Auxiliary supply stage 28 and auxiliary scavenge stage 30 are both driven by auxiliary pump shaft 26, which can be connected through gearing to a low pressure spool (not shown). Auxiliary supply stage 28 pumps liquid L from fluid storage assembly 12 through auxiliary supply passage 38 to engine component 32D. Under normal operation, auxiliary supply passage 38 and main supply passage 34 both supply liquid L to engine component 32D. Auxiliary scavenge stage 30 pumps liquid L and air A from engine component 32D, through scavenge sub-passage 42D, through auxiliary scavenge passage 54, to filter 52. At filter 52, liquid L and air A from auxiliary scavenge passage 54 combine with liquid L and air A from combined main scavenge passage 44 to flow through scavenge passage 40 into fluid storage assembly 12.

Backup connection passage 46 connects auxiliary supply passage 38 to main supply passage 34, at points downstream of auxiliary supply stage 28 and main supply stage 20. In the illustrated embodiment, check valve 48A allows fluid flow from auxiliary supply passage 38 through backup connection passage 46 to main supply passage 34 but impedes fluid flow in an opposite direction. If pressure in main supply passage 34 is greater than pressure in auxiliary supply passage 38, check valve 48A reduces fluid flow through backup connection passage 46. Under these conditions most or all of liquid L pumped by auxiliary supply stage 28 can be routed to engine component 32D. If, on the other hand, pressure in main supply passage 34 is less than pressure in auxiliary supply passage 38, check valve 48A allows fluid flow through backup connection passage 46. Under these conditions, a portion of liquid L pumped by auxiliary supply stage 28 can be routed to engine component 32D and another portion of liquid L pumped by auxiliary supply stage 28 can be routed to engine components 32A, 32B, and 32C.

In an alternative embodiment, check valve 48A can be replaced with an orifice. Liquid L can then flow through backup connection passage 46 in either direction according to a pressure gradient. In either embodiment, auxiliary supply stage 28 can act as a backup pump to some or all engine components when fluid flow through main supply passage 34 is reduced or stopped.

In one embodiment, engine component 32D can be a fan drive gear system to operably connect a fan to a low pressure spool (one example of a fan drive gear system is described in U.S. patent application Ser. No. 11/906,602 entitled EPICYCLE GEAR TRAIN FOR VARIABLE CYCLE ENGINE). The fan drive gear system can have journal bearings that benefit from uninterrupted lubrication. A gear ratio for the fan drive gear system can allow the fan to rotate at a speed slower than the low pressure spool. In another alternative embodiment, engine component 32D can be a front bearing compartment. The front bearing compartment can support a low pressure compressor. In yet another alternative embodiment, engine component 32D can be a combination of the fan drive gear system and the front bearing compartment. Engine component 32C can be a middle bearing compartment for bearings that support the low pressure compressor and/or a high pressure compressor. The middle bearing compartment can also include an auxiliary gearbox. Engine component 32B can be a rear bearing compartment for bearings that support a high pressure turbine and/or a low pressure turbine. Engine component 32A can be an extra bearing compartment for bearings that support the low pressure turbine. In alternative embodiments, engine components 32A, 32B, 32C, and 32D can be any set of components in a piece of machinery that use the same liquid.

When the gas turbine engine is not operating, wind can blow through and rotate the fan (not shown). The fan's rotation can rotate the fan drive gear system which rotates the low pressure spool, which activates auxiliary pump assembly 24. Wind can also rotate the high pressure compressor attached to the high pressure spool, but it may not rotate fast enough to effectively activate main pump assembly 16. In such a situation, auxiliary supply stage 28 can supply enough liquid L to engine components 32A, 32B, 32C, and 32D to reduce engine component wear from wind-induced movement. One or more engine components 32A, 32B, 32C, and 32D can have ball bearings able to operate with little or no lubrication for a period of time but that nonetheless benefit from lubrication.

Figure 2A:
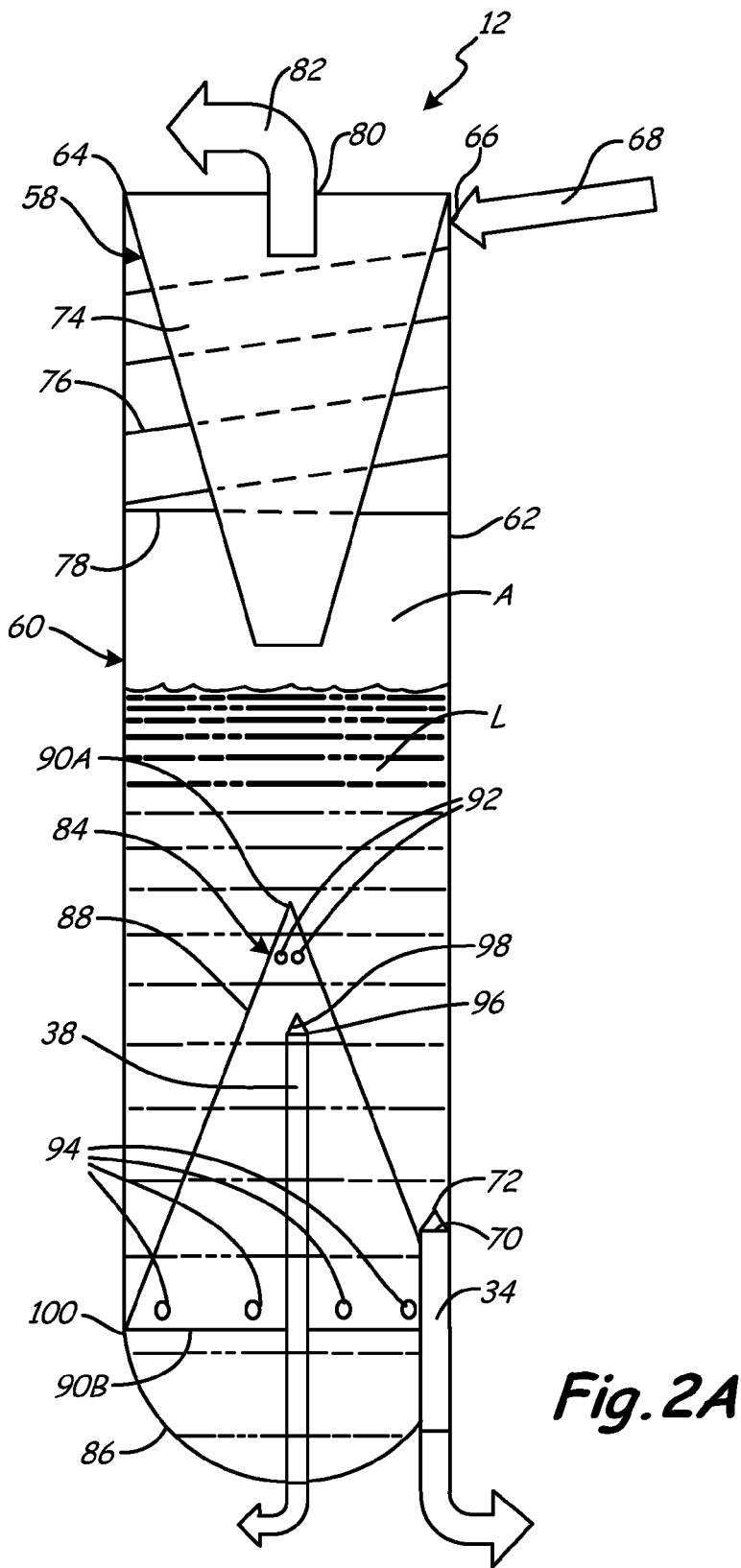
FIG. 2A is a schematic sectional view of a fluid storage assembly of the present invention.

FIG. 2A is a schematic sectional view of fluid storage assembly 12 that includes main reservoir 60, main reservoir shell 62, main reservoir top portion 64, scavenge inlet 66, scavenge flow 68—which is a mixture of liquid L and air A, main supply orifice 70, main supply screen 72, deaerator center portion 74, deaerator spiral 76, spiral fluid outlet 78, breather outlet 80, breather flow 82, auxiliary reservoir 84, auxiliary reservoir bottom 86, auxiliary reservoir shell 88, auxiliary shell top 90A, auxiliary shell bottom 90B, vent holes 92, fill holes 94, auxiliary supply orifice 96, auxiliary supply screen 98, and reservoir interface 100.

In the illustrated embodiment, main reservoir 60 has a generally cylindrical main reservoir shell 62 that encloses a cavity for holding liquid L and air A. Auxiliary reservoir 84 has a generally conical auxiliary reservoir shell 88 and a dome-shaped auxiliary reservoir bottom 86. Auxiliary reservoir 84 is located generally inside main reservoir 60, attached near the bottom of main reservoir 60 at reservoir interface 100. Auxiliary reservoir shell 88 has vent holes 92 near auxiliary shell top 90A and fill holes 94 near auxiliary shell bottom 90B. In the illustrated embodiment, vent holes 92 are circular holes through auxiliary reservoir shell 88. Fill holes 94 can also be circular holes through auxiliary reservoir shell 88, and can have flow areas larger than the flow areas of vent holes 92. In alternative embodiments, vent holes 92 can be any passage that allows air flow from auxiliary reservoir 84 to main reservoir 60, and fill holes 94 can be any passage that allows liquid flow from main reservoir 60 to auxiliary reservoir 84. Furthermore, in alternative embodiments, auxiliary reservoir shell 88 can be any shape that tapers from auxiliary shell bottom 90B to auxiliary shell top 90A, such as a dome.

Deaerator 58 is located inside main reservoir 60, attached to main reservoir top portion 64. Deaerator 58 includes deaerator center portion 74, which has a generally frusto-conical shape and an air-permeable surface. Deaerator spiral 76 wraps around deaerator center portion 74 with scavenge inlet 66 at its top and spiral fluid outlet 78 at its bottom. Scavenge passage 40 attaches to main reservoir 60 at scavenge inlet 66. Scavenge flow 68 indicates the direction of liquid L and air A flow from scavenge passage 40 (not shown in FIG. 2A), through scavenge inlet 66, and into deaerator 58. Under normal operation, gravity directs liquid L down deaerator spiral 76 and through spiral fluid outlet 78 to a main cavity of main reservoir 60. Air A is generally directed through the permeable surface of deaerator center portion 74 and through breather outlet 80. Breather flow 82 indicates the direction of air A flow out of breather outlet 80 to deoiler 50 and breather 14 (shown in FIG. 1). Deoiler 50 removes fine particles of liquid L from air A and directs liquid L back to fluid storage assembly 12 and air A to breather 14. In alternative embodiments, deaerator 58 can be nearly any deaerator configured to separate air A from liquid L.

Main supply passage 34 extends into main reservoir 60, adjacent to main reservoir shell 62. Main supply passage 34 can be a cylindrical pipe with main supply orifice 70 opening into main reservoir 60. Main supply screen 72 covers main supply orifice 70 to prevent debris in main reservoir 60 from entering main supply passage 34. Liquid L is pumped out of main reservoir 60 through main supply passage 34 by main supply stage 20 as described above with respect to FIG. 1.

Auxiliary supply passage 38 extends into auxiliary reservoir 84. Auxiliary supply passage 38 is a generally vertically oriented, substantially cylindrical pipe with auxiliary supply orifice 96 opening into auxiliary reservoir 84. Under normal, upright operating conditions as in the illustrated embodiment, auxiliary supply orifice 96 is located vertically higher than fill holes 94 and vertically lower than vent holes 92. Thus, auxiliary supply orifice 96 is generally between each of fill holes 94 and each of vent holes 92 even when fluid storage apparatus 12 is oriented sideways or upside-down. Auxiliary supply screen 98 covers auxiliary supply orifice 96 to prevent debris in auxiliary reservoir 84 from entering auxiliary supply passage 38. Liquid L is pumped out of auxiliary reservoir 84 through auxiliary supply passage 38 by auxiliary supply stage 28 as described above with respect to FIG. 1.

Under normal operating conditions, fluid storage assembly 12 can be orientated generally upright, with deaerator 58 located above auxiliary reservoir 84, as illustrated. Liquid L can settle at the bottom of main reservoir 60 and auxiliary reservoir 84 by way of gravity. A liquid level within main reservoir 60 can be high enough to cover main supply orifice 70, auxiliary supply orifice 96, and all of auxiliary reservoir shell 88. Liquid L can exit main reservoir 60 through main supply passage 34 and exit auxiliary reservoir 84 through auxiliary supply passage 38. Liquid L exiting auxiliary reservoir 84 can be replaced by liquid L from main reservoir 60 flowing through fill holes 94. A small amount of liquid L from main reservoir 60 can also flow through vent holes 92 but the primary function of vent holes 92 is to vent air, as further explained below. In this manner, auxiliary reservoir 84 can remain substantially full of liquid L.

Under certain conditions, liquid L may not necessarily settle at the bottom of main reservoir 60. This could occur under commonly occurring physical conditions such as fluid storage assembly 12 inverting, fluid storage assembly 12 accelerating toward the Earth at a rate equal to the rate of gravity (zero gravity) or greater than the rate of gravity (negative gravity), or fluid storage assembly 12 decelerating at the end of a vertical ascent. For convenience, these conditions, and other conditions creating a similar effect, are collectively referred to herein as "negative gravity" conditions. Under negative gravity conditions, liquid L can settle at the top of main reservoir 60 while air A settles at the bottom of main reservoir 60. Main supply orifice 70 can then be temporarily exposed to air A. If vent holes 92 are sufficiently small and if auxiliary reservoir 84 is substantially full of liquid L immediately prior to the onset of negative gravity conditions, auxiliary reservoir 84 will remain substantially full of liquid L immediately after the onset of negative gravity conditions. Auxiliary supply orifice 96 can then remain submerged in liquid L so that auxiliary supply passage 38 can have an uninterrupted supply of liquid L for a period of time during negative gravity conditions. As liquid L exits auxiliary reservoir 84 through auxiliary supply orifice 96 and/or through vent holes 92, air A can enter auxiliary reservoir 84 through fill holes 94. When negative gravity conditions end and normal operating conditions resume, liquid L can once again settle at the bottom of fluid storage assembly 12. Any air A that entered auxiliary reservoir 84 can exit to main reservoir 60 through vent holes 92, replaced by liquid L entering through fill holes 94. Auxiliary reservoir 84 can then return to a state of being substantially full of liquid L. If a sufficiently small quantity of air A entered auxiliary reservoir 84 during negative gravity conditions, auxiliary supply orifice 96 can have an uninterrupted supply of liquid L during normal operating conditions, negative gravity conditions, and the transitions therebetween.

Figure 2B:
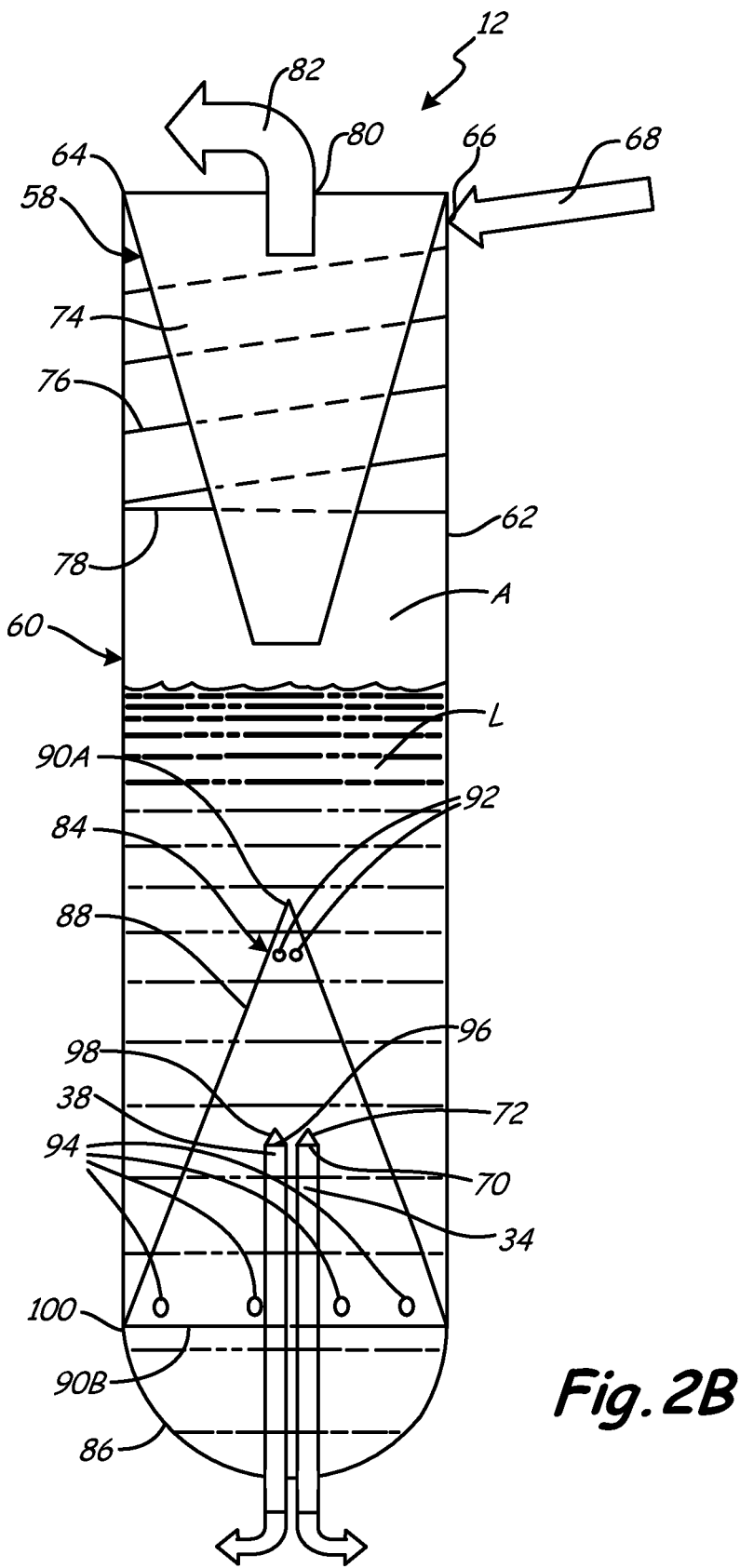
FIG. 2B is a schematic sectional view of an alternative embodiment of the fluid storage assembly of FIG. 2A.

In alternative embodiments, such as that shown in FIG. 2B, main supply passage 34, main supply orifice 70, and main supply screen 72 can be located inside auxiliary reservoir 84 along with auxiliary supply passage 38. Thus, main supply orifice 70 and auxiliary supply orifice 84 can both benefit from uninterrupted supply of liquid L during normal operating conditions, negative gravity conditions, and the transitions therebetween.

In further alternative embodiments, such as that shown in FIG. 2C, main supply passage 34, main supply orifice 70, and main supply screen 72 can be omitted in favor of having a single auxiliary supply passage 38, auxiliary supply orifice 96, and auxiliary supply screen 98 located in auxiliary reservoir 84. Auxiliary supply passage 38 can branch to supply liquid L to both main supply stage 20 and auxiliary supply stage 28.

Figure 3A:
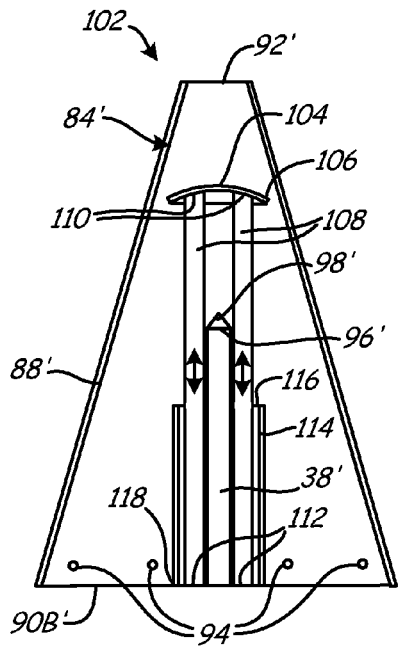
FIG. 3A is a schematic sectional view of an open roll-over valve for an alternative embodiment of the auxiliary reservoir of FIG. 2A.
Figure 3B:
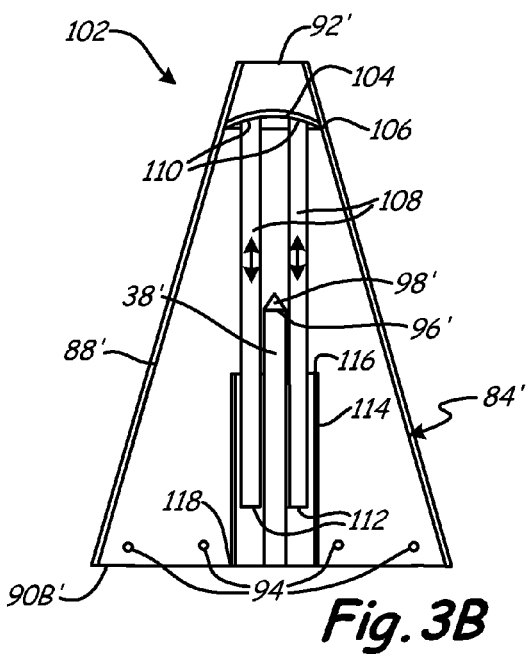
FIG. 3B is a schematic sectional view of a closed roll-over valve for the alternative embodiment of the auxiliary reservoir of FIG. 3A.

As described above, the flow of liquid L from auxiliary reservoir 84 to main reservoir 60 during negative gravity conditions is limited by the relatively small flow area of vent holes 92. In alternative embodiments, a roll-over valve can be used to limit such flow. FIGS. 3A and 3B are schematic sectional views of roll-over valve 102 for an alternative embodiment of auxiliary reservoir 84'. In FIG. 3A, roll-over valve 102 includes auxiliary reservoir disc 104, auxiliary reservoir disc edge 106, support stems 108, support stem top ends 110, support stem bottom ends 112, sleeve 114, sleeve top 116, and sleeve bottom 118. Auxiliary reservoir disc 104 is a circular sheet of metal, having a concave shape with auxiliary reservoir disc edge 106 at a perimeter thereof. Auxiliary reservoir disc 104 has a diameter generally larger than a diameter of vent hole 92'. The concave side of auxiliary reservoir disc 104 attaches to four support stems 108 at support stem top ends 110 (only two support stems 108 are shown in FIG. 3A). Support stems 108 can be cylindrical beams, each with an axis parallel to an axis of the portion of auxiliary supply passage 38' that extends inside auxiliary reservoir 84'. Support stems 108 are each aligned adjacent to auxiliary supply passage 38'. Sleeve 114 can be a cylindrical pipe, partially enclosing and sharing an axis with auxiliary supply passage 38'. Sleeve 114 is spaced apart from auxiliary supply passage 38' by a distance greater than the diameter of support stems 108. Sleeve 114 has a solid sleeve bottom 118. Sleeve bottom 118 is a flat bottom that attaches sleeve 114 to auxiliary supply passage 38'. Sleeve 114 is open at sleeve top 116. Support stems 108 pass through sleeve top 116 so as to slide freely between sleeve 114 and supply passage 38'. Support stems 108 are spaced apart from each other so as to allow liquid L to flow into auxiliary supply orifice 96'.

Auxiliary reservoir 84' is the same shape in FIG. 3A as in FIG. 2A except that auxiliary shell top 90A' has been cut off, causing auxiliary reservoir shell 88' to have a substantially frusto-conical shape. Consequently, there is one relatively large vent hole 92' in FIG. 3A, as opposed to several relatively small vent holes 92 as in FIG. 2A. When support stem bottom ends 112 are substantially adjacent to sleeve bottom 118, auxiliary reservoir disc 104 is spaced substantially apart from vent hole 92'. Roll-over valve 102 is then in an "open" position. Liquid L can flow through both auxiliary supply orifice 96' and vent hole 92'. Under normal operating conditions, roll-over valve 102 is held open by gravity.

FIG. 3B is a schematic sectional view of roll-over valve 102 in a "closed" position. In the closed position, support stem bottom ends 112 are spaced apart from sleeve bottom 118, and auxiliary reservoir disc edge 106 is substantially adjacent to auxiliary reservoir shell 88'. The location of auxiliary reservoir disc edge 106 substantially adjacent to auxiliary reservoir shell 88' reduces the flow of liquid L through vent hole 92'. Liquid L can continue to flow through auxiliary supply orifice 96'. Under negative gravity conditions, roll-over valve 102 can be closed. In alternative embodiments, roll-over valve 102 can be nearly any valve that allows the flow of air A through vent hole 92' under normal operating conditions but reduces the flow of liquid L through vent hole 92' under negative gravity conditions.

Figure 3C:
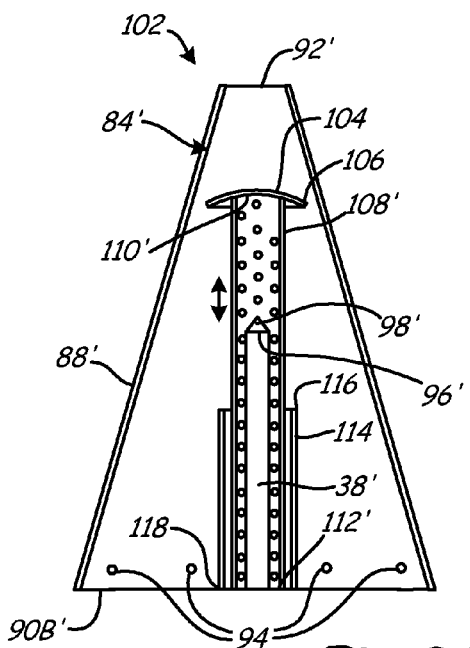
FIG. 3C is a schematic sectional view of an open roll-over valve for another alternative embodiment of the auxiliary reservoir of FIG. 2A.

FIG. 3C is a schematic sectional view of an alternative embodiment of roll-over valve 102 in an "open" position. In the embodiment illustrated in FIG. 3C, support stem 108' is a one piece perforated cylinder as opposed to four separate support stems 108 as illustrated in FIGS. 3A and 3B. Support stem 108' can reduce weight and complexity while still allowing fluidic travel to supply orifice 96'. Aside from the difference in support stem 108', roll-over valve 102 is essentially the same in FIG. 3C as in FIGS. 3A and 3B.

Figure 4A:
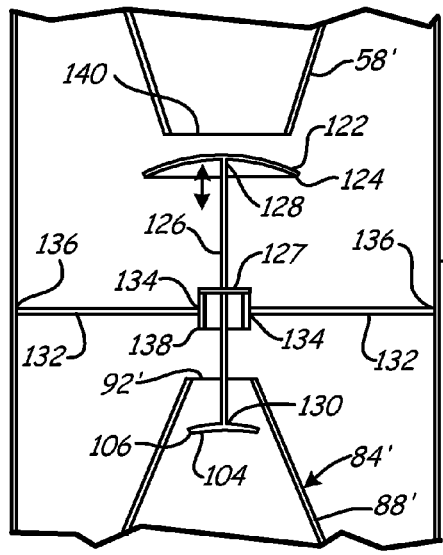
FIG. 4A is a schematic sectional view of an open roll-over valve for another alternative embodiment of the auxiliary reservoir and the deaerator of FIG. 2A.
Figure 4B:
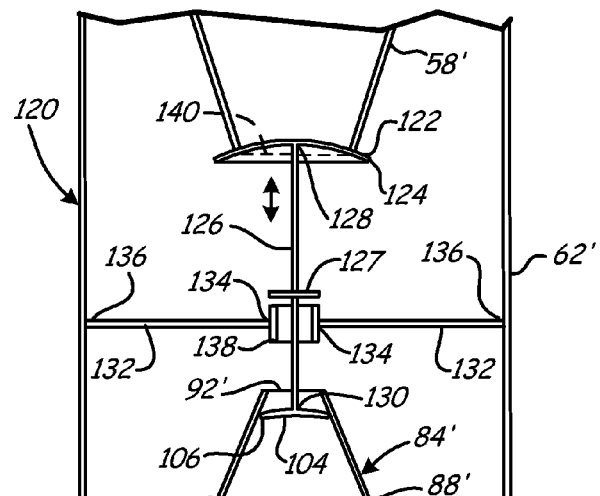
FIG. 4B is a schematic sectional view of a closed roll-over valve for the alternative embodiment of the auxiliary reservoir and the deaerator of FIG. 4A.

FIGS. 4A and 4B are schematic sectional views of roll-over double valve 120 for an alternative embodiment of auxiliary reservoir 84' and deaerator 58'. In FIG. 4A, roll-over double valve 120 includes auxiliary reservoir disc 104, auxiliary reservoir disc edge 106, deaerator disc 122, deaerator disc edge 124, connecting stem 126, connecting stem stopper 127, connecting stem top end 128, connecting stem bottom end 130, side support beams 132, side support beams inner ends 134, side support beams outer ends 136, and slider 138. Auxiliary reservoir disc 104 is a circular sheet of metal, concave with auxiliary reservoir disc edge 106 at a perimeter. Auxiliary reservoir disc 104 has a diameter larger than a diameter of vent hole 92'. Deaerator disc 122 is also a circular sheet of metal, having a concave shape with deaerator disc edge 124 at a perimeter. Deaerator disc 122 has a diameter larger than a diameter of deaerator vent passage 140. Connecting stem 126 is a cylindrical beam, with an axis parallel to an axis of the portion of auxiliary supply passage 38' (not shown in FIGS. 4A and 4B) that extends inside auxiliary reservoir 84'. Connecting stem top end 128 is attached to a center of the concave side of deaerator disc 122, and connecting stem bottom end 130 is attached to a center of the convex side of auxiliary reservoir disc 104. Slider 138 is a cylindrical ring with a hollow center with a diameter greater than the diameter of connecting stem 126. Connecting stem 126 shares an axis with and slides freely inside of slider 138. Connecting stem stopper 127 is rigidly attached to connecting stem 126 with a width larger than an inner diameter of slider 138. Connecting stem stopper 127 limits the distance connecting stem 126 can slide through slider 138 in one direction. While in the "open" position, connecting stem stopper 127 rests on an upper surface of slider 138. Side support beams 132 are cylindrical beams that attach to slider 138 at side support beam inner ends 134 and attach to main reservoir shell 62' at side support beam outer ends 136. When auxiliary reservoir disc 104 is spaced from vent hole 92', air A can flow through vent hole 92'. When deaerator disc 122 is spaced from deaerator vent passage 140, air A can flow through deaerator vent passage 140. Under normal operating conditions, roll-over double valve 120 is held "open" by gravity in this manner.

FIG. 4B is a schematic sectional view of roll-over double valve 120 in a "closed" position. In the closed position, auxiliary reservoir disc edge 106 is substantially adjacent to auxiliary reservoir shell 88, and deaerator disc 122 is substantially adjacent to deaerator vent passage 140. Connecting stem 126 is configured to have a length sufficient to allow auxiliary reservoir disc edge 106 to be substantially adjacent to auxiliary reservoir shell 88' and deaerator disc 122 to be substantially adjacent to deaerator vent passage 140 at the same time. Roll-over double valve 120 limits the flow of liquid L through both vent hole 92' and deaerator vent passage 140 in the closed position. Under negative gravity conditions, roll-over double valve 120 can be closed. In alternative embodiments, roll-over double valve 120 can be nearly any valve that allows the flow of air A through vent hole 92' and deaerator vent passage 140 under normal conditions but reduces the flow of liquid L through vent hole 92' and deaerator vent passage 140 under negative gravity conditions.

Figure 4C:
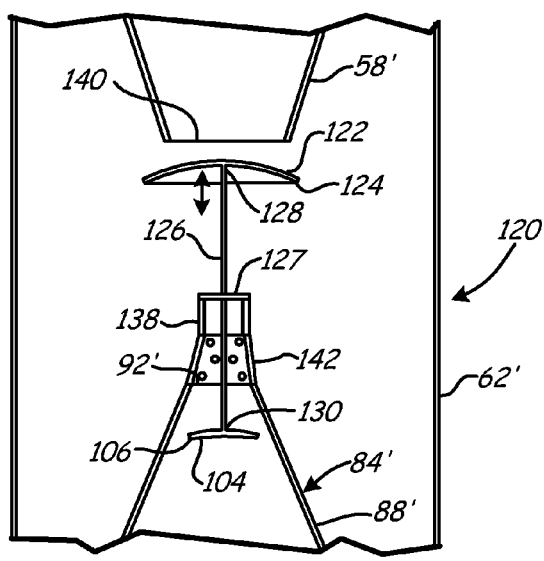
FIG. 4C is a schematic sectional view of an open roll-over valve for another alternative embodiment of the auxiliary reservoir and the deaerator of FIG. 2A.

FIG. 4C is a schematic sectional view of an alternative embodiment of roll-over double valve 120 in an "open" position. In the embodiment illustrated in FIG. 4C, perforated cone 142 can attach between auxiliary reservoir shell 88' and slider 138. Perforated cone 142 provides structural support for slider 138 while still allowing fluid flow through vent hole 92'. Consequently, side support beams 132 can be omitted to save weight and reduce complexity.

It will be recognized that the present invention provides numerous benefits and advantages. For example, the present invention can provide lubrication to components with improved reliability, as described above. Moreover, a system having a single fluid storage assembly with two reservoirs according to the present invention can weigh less than a system having two separate fluid storage assemblies. Furthermore, by allowing liquid returned from various engine components to intermix in a single fluid storage assembly, heat can be dissipated from a warmer component to a cooler component. Still furthermore, the illustrated two reservoir configuration allows for improved deaeration of the liquid at the time of entering the auxiliary reservoir because the extended path the fluid must take to enter the auxiliary reservoir allows more opportunity for any air bubbles to liberate.

Although the present invention has been described with reference to preferred embodiments, workers skilled in the art will recognize that changes may be made in form and detail without departing from the spirit and scope of the invention. For example, the shape of main reservoir shell 62, auxiliary reservoir bottom 86, and auxiliary reservoir shell 88 can be varied as necessary for particular applications. The number of pumps, number of liquid delivery locations, number of vent passages, and number of roll-over valves can also vary. Additionally, the use of fluid storage assembly 12 as described in FIGS. 2A, 2B, 2C, 3A, 3B, 4A, and 4B is not limited to its use in lubrication apparatus 10 as described in FIG. 1. Instead, fluid storage assembly 12 can be used with virtually any aircraft engine. Moreover, fluid storage assembly 12 can be used to hold fluid in any apparatus that benefits from any of the advantages of fluid storage assembly 12.

What is claimed is:

1. An assembly comprising:
   a main reservoir for holding a fluid;
   an auxiliary reservoir located inside the main reservoir near a bottom of the main reservoir, the auxiliary reservoir comprising:
      an auxiliary reservoir shell comprising a shell top and a shell bottom;
      at least one fill passage through the auxiliary reservoir shell at or near the shell bottom; and
      at least one vent passage through the auxiliary reservoir shell at or near the shell top, wherein the auxiliary reservoir is fluidically connected to the main reservoir by the fill passage and the vent passage;
   a fluid inlet located inside the main reservoir and outside of the auxiliary reservoir; and
   a fluid outlet located inside the auxiliary reservoir and vertically positioned between the fill passage and the vent passage.

2. The assembly of claim 1, wherein the vent passage has a smaller flow area than the fill passage.

3. The assembly of claim 1, wherein the fill passage is configured to allow fluid flow from the main reservoir to the auxiliary reservoir under normal operating conditions.

4. The assembly of claim 1, wherein the vent passage is configured to allow air flow from the auxiliary reservoir to the main reservoir under normal operating conditions.

5. The assembly of claim 1, and further comprising:
   a first supply passage in fluid communication with the fluid outlet; and
   a first pump operably connected to the first supply passage for pumping the fluid from the auxiliary reservoir to a first engine component.

6. The assembly of claim 5, and further comprising:
   a second supply passage connected to the main reservoir; and
   a second pump operably connected to the second supply passage for pumping the fluid from the main reservoir to a second engine component.

7. The assembly of claim 6, and further comprising:
   a backup connection passage fluidically connected to the first supply passage at a first interface between the first pump and the first engine component to the second supply passage at a second interface between the second pump and the second engine component.

8. The assembly of claim 5, wherein the first engine component comprises a fan drive gear system for a gas turbine engine, wherein the fan drive gear system operably connects a fan to a low pressure spool.

9. The assembly of claim 1, wherein the auxiliary reservoir shell is rigid and tapers from the shell bottom to the shell top.

10. An assembly comprising:
    a main reservoir for holding a fluid;
    an auxiliary reservoir located inside the main reservoir near a bottom of the main reservoir, the auxiliary reservoir comprising:
       an auxiliary reservoir shell comprising a shell top and a shell bottom;
       a fill passage through the auxiliary reservoir shell at or near the shell bottom; and
       a vent passage through the auxiliary reservoir shell at or near the shell top, wherein the auxiliary reservoir is fluidically connected to the main reservoir by the fill passage and the vent passage;
    a fluid inlet located inside the main reservoir and outside of the auxiliary reservoir;
    a fluid outlet located inside the auxiliary reservoir and vertically positioned between the fill passage and the vent passage; and
    a valve configured to allow fluid flow through the vent passage in a first valve position and to reduce fluid flow through the vent passage in a second valve position.

11. The assembly of claim 10, wherein the valve is in the first valve position under normal operating conditions and in the second valve position under negative gravity conditions.

12. The assembly of claim 10, and further comprising:
    a deaerator comprising a deaerator vent passage for allowing air flow between the deaerator and the main reservoir, and wherein the valve is further configured to allow fluid flow through the deaerator vent passage in a first valve position and to reduce fluid flow through the deaerator vent passage in a second valve position.

* * * * *